US008874919B2

United States Patent
Kim

(10) Patent No.: US 8,874,919 B2
(45) Date of Patent: Oct. 28, 2014

(54) APPARATUS AND METHOD OF A PORTABLE TERMINAL AUTHENTICATING ANOTHER PORTABLE TERMINAL

(75) Inventor: Dae Youb Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 854 days.

(21) Appl. No.: 13/007,442

(22) Filed: Jan. 14, 2011

(65) Prior Publication Data

US 2011/0179278 A1    Jul. 21, 2011

(30) Foreign Application Priority Data

Jan. 15, 2010   (KR) .................. 10-2010-0003858

(51) Int. Cl.
  *H04L 9/32*   (2006.01)
  *G06F 21/33*  (2013.01)
  *H04L 29/06*  (2006.01)

(52) U.S. Cl.
  CPC ........ *H04L 63/08* (2013.01); *G06F 2221/2129* (2013.01); *G06F 21/33* (2013.01)
  USPC ............ 713/175; 713/156; 713/169; 713/181

(58) Field of Classification Search
  None
  See application file for complete search history.

(56) References Cited

U.S. PATENT DOCUMENTS

| | | | |
|---|---|---|---|
| 8,380,982 B2* | 2/2013 | Miyabayashi et al. | 713/156 |
| 8,397,062 B2* | 3/2013 | Roy-Chowdhury et al. | 713/157 |
| 2004/0054907 A1* | 3/2004 | Chateau et al. | 713/175 |
| 2006/0026433 A1* | 2/2006 | Montenegro | 713/181 |
| 2006/0236377 A1 | 10/2006 | Metke et al. | |
| 2007/0204149 A1* | 8/2007 | Balfanz et al. | 713/156 |
| 2009/0113543 A1* | 4/2009 | Adams et al. | 726/18 |
| 2009/0240941 A1* | 9/2009 | Lee et al. | 713/169 |
| 2010/0031031 A1* | 2/2010 | Tian et al. | 713/156 |
| 2010/0070771 A1* | 3/2010 | Chen et al. | 713/176 |

FOREIGN PATENT DOCUMENTS

| | | |
|---|---|---|
| EP | 1 315 394 | 5/2003 |
| JP | 2007-243562 | 9/2007 |
| KR | 10-2003-0027506 | 4/2003 |
| KR | 10-2005-0072508 | 7/2005 |
| KR | 10-2006-0045195 | 5/2006 |
| KR | 10-2006-0073308 | 6/2006 |
| KR | 10-2007-0096488 | 10/2007 |

* cited by examiner

*Primary Examiner* — Shin-Hon Chen
*Assistant Examiner* — Trang Doan
(74) *Attorney, Agent, or Firm* — NSIP Law

(57) ABSTRACT

Provided is an apparatus and method of a portable terminal authenticating another portable terminal. The portable terminal may receive a seed generated by the other portable terminal, issue an authentication certificate generated using the seed to the other portable terminal, authenticate the other portable terminal based on the authentication certificate, and provide a secure communication.

26 Claims, 11 Drawing Sheets

APPARATUS AND METHOD OF A PORTABLE TERMINAL AUTHENTICATING ANOTHER PORTABLE TERMINAL

CROSS-REFERENCE TO RELATED APPLICATION(S)

This application claims the benefit under 35 U.S.C. §119 (a) of Korean Patent Application No. 10-2010-0003858, filed on Jan. 15, 2010, in the Korean Intellectual Property Office, the entire disclosure of which is incorporated herein by reference for all purposes.

BACKGROUND

1. Field

The following description relates to a portable terminal authenticating method and apparatus, and more particularly, to a method in which a portable terminal authenticates another portable terminal.

2. Description of Related Art

Wireless networks, such as WiFi, Bluetooth, and WiBro, provide communication between at least two devices, such as portable terminals. Secure communication may be desired to securely operate an application service, such as sharing of contents between portable terminals. As such, there is a desire for a mutual authentication method to provide secure communication between portable terminals.

Generally, an authentication protocol of a communication system may be dependent upon key information stored in a secure server, such as a subscriber identity module (SIM), a portable terminal, and/or a network, such as an authentication center. The key information may be shared secure information or may be, for example, both a secret key and a public key. In a system using the shared secure information, authentication information may be generated based on the shared secure information, and the authentication information may be generally used in a challenge-response protocol for authenticating a portable terminal for a network. In a challenge-response protocol, one party asks a question, or challenge, and another party provides an answer, or response. For example, one party may ask for a password and the other party then provides the password.

Although the authentication protocol has a high level of security, the authentication protocol may demand an authentication center that generates secure information, and may further demand an authentication server, such as a telecommunication firm or a bank, that authenticates the authentication information generated by the authentication center. Accordingly, the authentication protocol is inappropriate for authentication between the portable terminals.

SUMMARY

In one general aspect, there is provided a method for authentication of a portable terminal requesting an authentication, the method comprising: receiving a first seed from an authentication response terminal via an authentication channel; transmitting a second seed to the authentication response terminal via the authentication channel; generating an authentication certificate using the first seed, the second seed, and a public key; and transmitting the authentication certificate to the authentication response terminal to register that authentication certificate in the authentication response terminal.

The method may further include that the authentication channel uses a location limited channel (LLC).

The method may further include that the authentication certificate comprises first verification information to verify a hashed public key and the authentication certificate, the hashed public key being generated by hashing the public key.

The method may further include that the first verification information is generated by hashing the first seed, the second seed, and the hashed public key.

The method may further include: generating an authentication request message; transmitting the authentication request message to the authentication response terminal in response to the authentication certificate being registered in the authentication response terminal; and setting a code channel in response to the authentication succeeding.

The method may further include that the authentication request message comprises identification information, a random number, the public key, and second verification information.

The method may further include that: the second verification information is generated by hashing a first hash value and a hashed public key; and the first hash value is generated by hashing the first seed and random number.

The method may further include that the setting of the code channel further comprises: receiving a code channel message that is encoded by the public key; decoding the received encoded code channel message to verify a session key included in the decoded code channel message; and setting the code channel using the session key.

In another general aspect, there is provided a method of authenticating in a portable terminal responding to an authentication request, the method comprising: transmitting a first seed to an authentication request terminal via an authentication channel; receiving a second seed from the authentication request terminal via the authentication channel, in response to a request for a seed being received from the authentication request terminal; and verifying an authentication certificate in response to the authentication certificate being received from the authentication request terminal, the authentication certificate being generated using the first seed, the second seed, and a public key.

The method may further include that the authentication certificate comprises first verification information verifying a hashed public key and the authentication certificate, the hashed public key being generated by hashing the public key.

The method may further include that the first verification information is generated by hashing the first seed, the second seed, and the hashed public key.

The method may further include that the verifying of the authentication certificate comprises: generating first verification information; and comparing the generated first verification information with first verification information included in the authentication certificate to determine that the authentication certificate is authenticated in response to the generated first verification information being identical to the first verification information included in the authentication certificate.

The method may further include: verifying an authentication request message in response to the authentication request message being received from the authentication request terminal; and setting a code channel in response to the authentication request message being verified.

The method may further include that the authentication request message comprises identification information, a random number, a public key of the authentication request terminal, and second verification information.

The method may further include that: the second verification information is generated by hashing a first hash value and the hashed public key; and the first hash value is generated by hashing the first seed and the random number.

The method may further include that the verifying of the authentication certificate comprises: generating second verification information; and comparing the generated second verification information with second verification information included in the authentication request message to determine that the authentication certificate is authenticated in response to the generated second verification information being identical to the second verification information included in the authentication request message.

The method may further include that the setting of the code channel further comprises: generating a session key; generating a code channel message including the session key; encoding the code channel message to generate the encoded code channel message; transmitting the encoded code channel message to the authentication request terminal; and setting the code channel using a session key.

In another general aspect, there is provided a portable terminal requesting an authentication, the portable terminal comprising: a seed generating unit configured to generate a second seed; and an authentication transmitting unit configured to: receive a first seed from an authentication response terminal via an authentication channel; transmit the second seed to the authentication response terminal; generate an authentication certificate using the first seed, the second seed, and a public key; and transmit the authentication certificate to the authentication response terminal to register the authentication certificate in the authentication response terminal.

The portable terminal may further include: an authentication requesting unit configured to: generate an authentication request message; and transmit, to the authentication response terminal, the generated authentication request message for the authentication, in response to the authentication certificate being registered in the authentication response terminal; and a secure communication processing unit configured to set a code channel in response to the portable terminal being authenticated.

In another general aspect, there is provided a portable terminal responding to an authentication request, the portable terminal comprising: a seed generating unit configured to generate a first seed; and an authentication certificate verifying unit configured to: transmit, to an authentication request terminal, the first seed via an authentication channel in response to a request for a seed being received from the authentication request terminal; receive a second seed from the authentication request terminal; and verify an authentication certificate to register the verified authentication certificate in response to the authentication certificate being received from the authentication request terminal, the authentication certificate being generated using the first seed, the second seed, and a public key.

The portable terminal may further include that the authentication verifying unit is further configured to: generate first verification information; and compare the generated first verification information with first verification information included in the authentication certificate to determine that the authentication certificate is authenticated in response to the generated first verification information being identical to the first verification information included in the authentication certificate.

The portable terminal may further include: an authentication unit configured to verify an authentication request message in response to the authentication request message being received from the authentication request terminal; and a secure communication processing unit configured to set a code channel in response to the authentication request message being authenticated.

The portable terminal may further include that the authentication unit is further configured to: generate second verification information; and compare the generated second verification information with second verification information included in the authentication request message to determine that the authentication request message is authenticated in response to the generated second verification information being identical to the second verification information included in the authentication request message.

In another general aspect, there is provided a method of authenticating between an authentication request terminal and authentication response terminal, the method comprising: transmitting a seed request message from the authentication request terminal to the authentication response terminal; receiving, at the authentication response terminal, the seed request message; verifying that the authentication request terminal is a terminal for which secure communication is allowed; in response to it being determined that the authentication request terminal is a terminal for which secure communication is allowed, transmitting a seed message, comprising a seed, to the authentication request terminal; generating, by the authentication request terminal, a second seed; transmitting the second seed to the authentication response terminal; generating, by the authentication request terminal, an authentication certificate; transmitting the authentication certificate to the authentication response terminal; verifying, by the authentication response terminal, the authentication certificate; storing the authentication certificate; and transmitting, by the authentication response terminal, an authentication certificate response message comprising a verification result to register the authentication certificate.

The method may further include: generating, by the authentication request terminal, an authentication request message; transmitting the authentication request message to the authentication response terminal in response to the authentication certificate being registered in the authentication response terminal; and setting a code channel in response to the authentication succeeding.

Other features and aspects may be apparent from the following detailed description, the drawings, and the claims.

Figure 1:
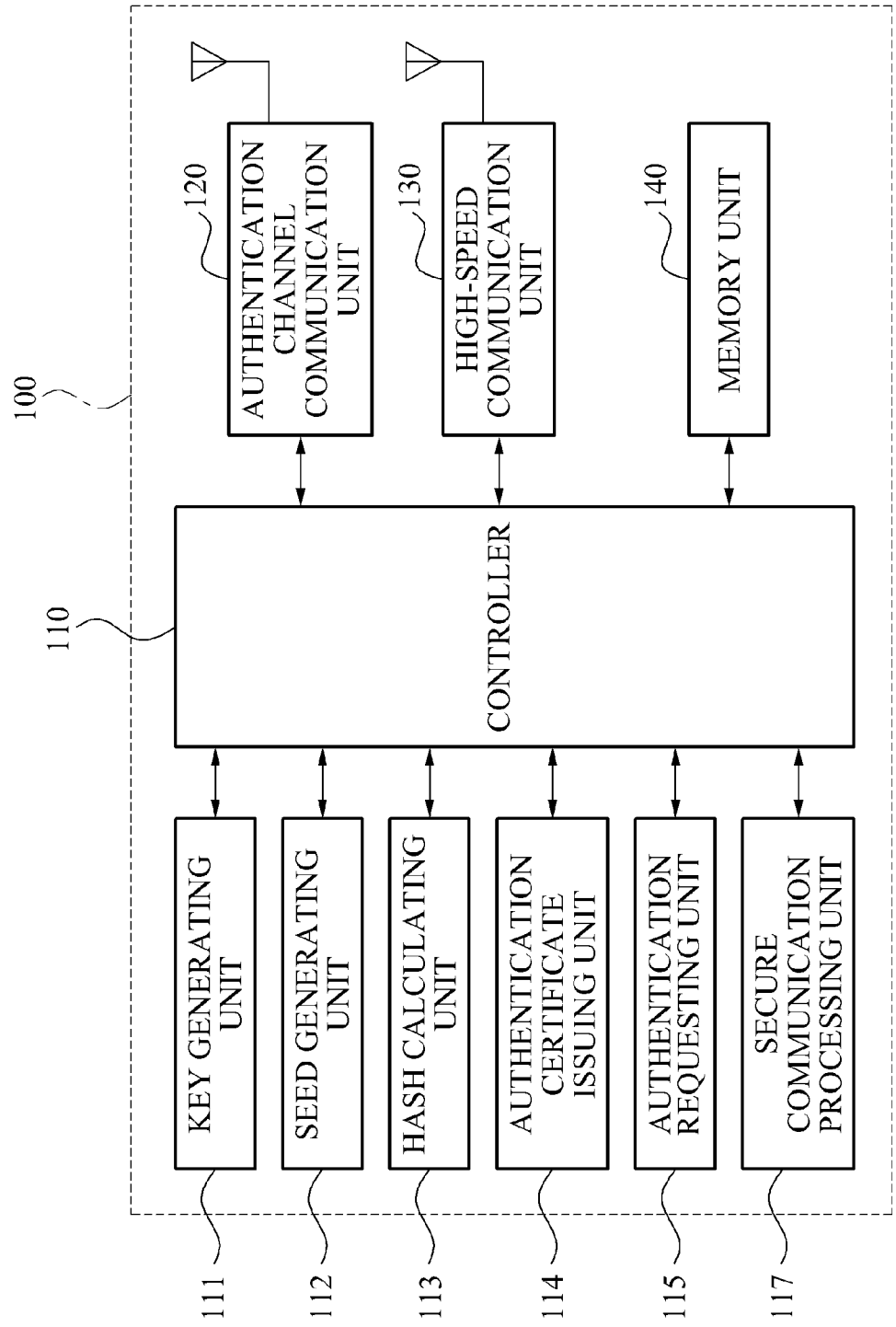
FIG. 1 is a diagram illustrating an example of a configuration of a portable terminal requesting an authentication.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

A portable terminal may issue an authentication certificate to another portable terminal. By doing so, the portable terminal may be authenticated by the other portable terminal based on the authentication certificate.

FIG. 1 illustrates an example of a configuration of a portable terminal 100 requesting an authentication. The portable terminal 100 requesting the authentication may also be referred to as "authentication request terminal A 100."

Referring to the example of FIG. 1, the authentication request terminal A 100 may include a controller 110, a key generating unit 111, a seed generating unit 112, a hash calculating unit 113, an authentication certificate issuing unit 114, an authentication requesting unit 115, a secure communication processing unit 117, an authentication channel communication unit 120, a high-speed communication unit 130, and a memory unit 140.

The authentication channel communication unit 120 may transmit/receive a seed via an authentication channel. The authentication channel may be, for example, a communication channel for which a user may directly indicate another party's device with which the user communicates. The communication channel may recognize whether a hacker joins or does not join the communication. One non-limiting example of the authentication channel includes a location-limited channel (LLC). Non-limiting examples of the LLC may include a short message service (SMS) or a multi-media message service (MMS) that is a message transmission service transmitting a message only to a designated receiver.

The high-speed communication unit 130 may transmit and receive encoded data via a communication channel that may not authenticate an actual transmitter/receiver. Communication schemes, such as WiFi, Bluetooth, and WiBro, for example, may be used by the high-speed communication unit 130. The list of schemes is nonlimiting.

Figure 2:
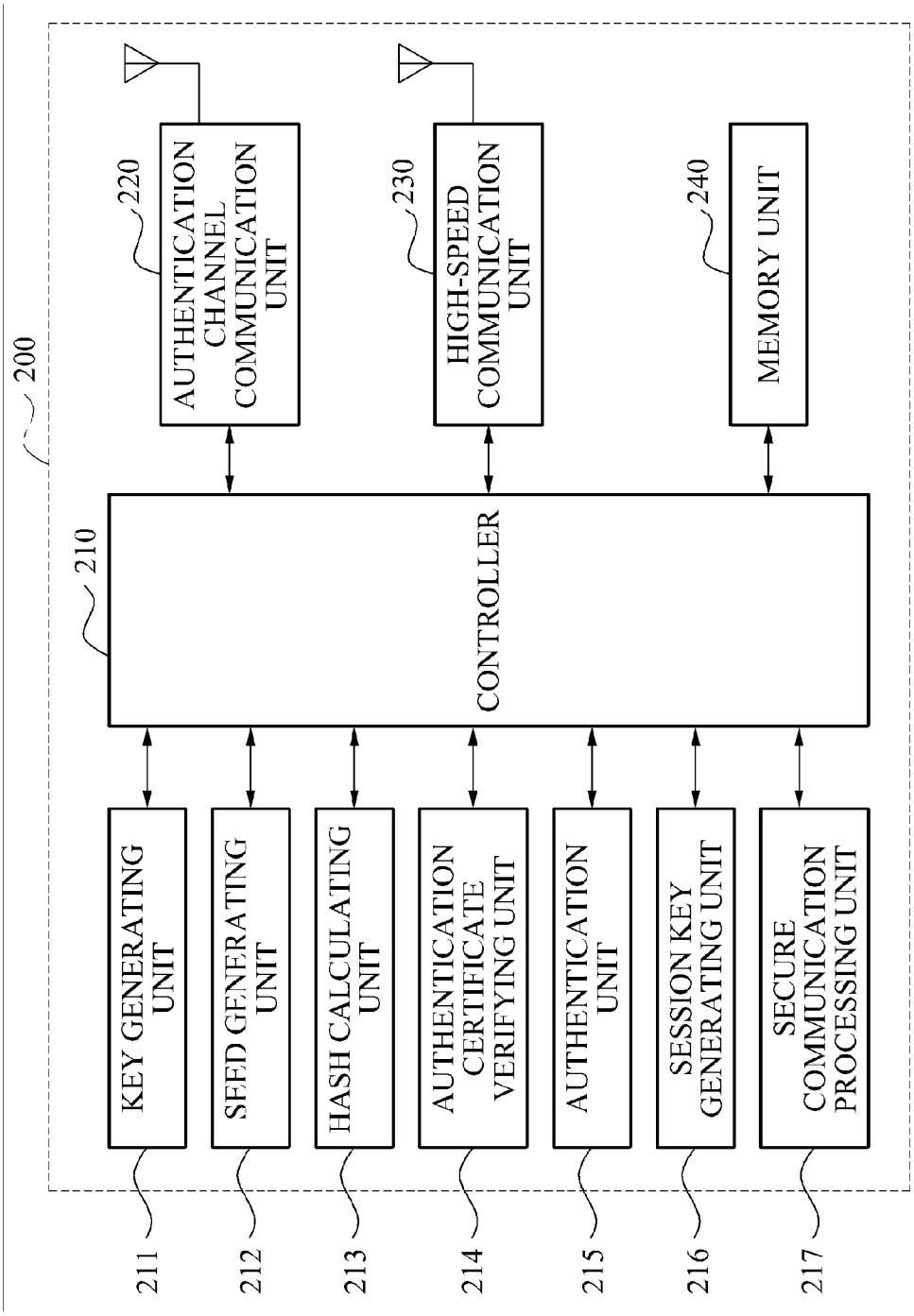
FIG. 2 is a diagram illustrating an example of a configuration of a portable terminal performing an authentication.

The memory unit 140 may store a public key $PK_A$, a secret key $SK_A$, and a seed $S_A$ of a corresponding terminal, e.g., the authentication request terminal A 100. The memory unit 140 may also store a hashed public key $H(PK_B)$ and a seed $S_B$ of another party's terminal for a secure communication, e.g., an authentication response terminal B 200 as shown in FIG. 2.

The key generating unit 111 may generate the public key $PK_A$ and the secret key $SK_A$.

The seed generating unit 112 may generate a random number, may designate the random number as the seed $S_A$, and may store the seed $S_A$ in the memory unit 140.

The hash calculating unit 113 may calculate a hash value using a hash function according to a request of the authentication certificate issuing unit 114 and a request of the authentication requesting unit 115. A hash function is a function that may convert a large amount of data into a small data, for example, a single integer or character, or a smaller number of characters than the original. For example, the hash function may also be a function that may not restore a value before being hashed, by inversely calculating from the hash value. That is, upon obtaining the hash value as an output of the hash function, the original value may not be obtained by inversely calculating using the hash function.

The authentication certificate issuing unit 114 may transmit a seed request message including identification information to the authentication response terminal B 200. In response to a seed message including the seed $S_B$ being received from the authentication response terminal B 200, the authentication certificate issuing unit 114 may store the seed $S_B$ in the memory unit 140, and may generate a seed message including the seed $S_A$ to transmit the authentication response terminal B 200. In one example, the seed message including the seed $S_B$ may be received and the seed message including the seed $S_A$ may be transmitted through the authentication channel communication unit 120 via the authentication channel.

In addition, the authentication certificate issuing unit 114 may generate an authentication certificate including a hashed public key $H(PK_A)$ and verification information $H(S_A,S_B,H(PK_A))$ to transmit to the authentication response terminal B 200 (FIG. 2).

The authentication requesting unit 115 may generate an authentication request message. The message may include identification information, a random number r, the public key $PK_A$, and the verification information $H(H(S_B,r), H(PK_A))$ to transmit the authentication request message to the authentication response terminal B 200.

Further, in response to an authentication result message being received, the authentication request unit 115 may determine whether an authentication succeeds based on an authentication result included in the received authentication result message.

In response to an encoded code channel message being received from the authentication response terminal B 200, the secure communication processing unit 117 may decode the received encoded code channel message to provide a decoded code channel message. The secure communication processing unit may then verify a session key included in the decoded code channel message. Also, the secure communication processing unit 117 may generate a code channel using the session key to provide a secure communication via the code channel. In one example, the encoded code channel message may be encoded based on the public key $PK_A$ of the authentication request terminal A 100, and may be decoded based on the secret key $SK_A$ of the authentication request terminal A 100.

The controller 110 may generally control the authentication request terminal A 100, and may also control the public key generating unit 111, the seed generating unit 112, the hash calculating unit 113, the authentication certificate issuing unit 114, the authentication requesting unit 115, and the secure communication processing unit 117. Alternatively, the controller 110 may perform functions of the public key generating unit 111, the seed generating unit 112, the hash calculating unit 113, the authentication certificate issuing unit 114, the authentication requesting unit 115, and the secure communication processing unit 117. The public key generating unit 111, the seed generating unit 112, the hash calculating unit 113, the authentication certificate issuing unit 114, the authentication requesting unit 115, and the secure communication processing unit 117 may be separately configured and illustrated to separately describe each of the functions. However, when a product is embodied, the controller 110 may be configured to perform all the described functions or may be configured to perform a part of the functions.

FIG. 2 illustrates an example of a configuration of a portable terminal 200 performing an authentication. The portable terminal 200 performing the authentication may also be referred to as "authentication response terminal B 200."

Referring to the example in FIG. 2, the authentication response terminal B 200 may include a controller 210, a key generating unit 211, a seed generating unit 212, a hash calculating unit 213, an authentication certificate verifying unit 214, an authentication unit 215, a session key generating unit 216, a secure communication processing unit 217, an authentication channel communication unit 220, a high-speed communication unit 230, and a memory unit 240.

The authentication channel communication unit 220 may transmit/receive a seed via an authentication channel. The authentication channel may be a communication channel for which a user directly indicates another party's device with which the user communicates. The communication channel may recognize whether or not a hacker has joined the communication.

The high-speed communication unit 230 may transmit and receive encoded data via a communication channel that may not authenticate an actual transmitter/receiver. Communication schemes, such as WiFi, Bluetooth, and WiBro, for example, may be used by the high-speed communication unit 130. Again, this list is nonlimiting.

The memory unit 240 may store a public key $PK_B$, a secret key $SK_B$, and a seed $S_B$ of a corresponding terminal, e.g., the authentication response terminal B 200. Also, the memory unit 240 may store a hashed public key $H(PK_A)$ and a seed $S_A$ of an opponent terminal, e.g., the authentication request terminal A 100, for a secure communication. In addition, the memory unit 240 may store an identification information table that may include predetermined identification information to determine whether to allow the secure communication. For example, if the identification information is telephone numbers, the identification information table may be a telephone book or lookup table.

The key generating unit 211 may generate the public key $PK_B$ and the secret key $SK_B$.

The seed generating unit 212 may generate a random number, designate the random number as the seed $S_B$, and store the seed $S_B$ in the memory unit 240.

The hash calculating unit 213 may calculate a hash value using a hash function according to a request of the authentication certificate verifying unit 214 and a request of the authentication unit 216. As discussed above, a hash function is a function that may convert a large amount of data into a small data. For example, the hash function may also be a function that may not restore a value before being hashed, by inversely calculating from the hash value. That is, upon obtaining the hash value as an output of the hash function, the original value may not be obtained by inversely calculating using the hash function.

In response to the seed request message being received, the authentication certificate verifying unit 214 may verify identification information included in the received seed request message to verify the authentication request terminal A 100.

In response to the authentication request terminal A 100 being determined to be a terminal for which the secure communication is allowable, the authentication certificate verifying unit 214 may transmit a seed message including the seed $S_B$ to the authentication request terminal A 100 via the authentication channel. In one example, the seed message may be included in an SMS message or an MMS message.

In response to a seed message including the seed $S_A$ being received via the authentication channel, the authentication certificate verifying unit 214 may store the seed $S_A$ in the memory unit 240.

In response to the authentication certificate including the hashed public key $H(PK_A)$ and verification information $H(S_A, S_B, H(PK_A))$ being received from the authentication request terminal A 100, the authentication certificate verifying unit 214 may verify the verification information $H(S_A, S_B, H(PK_A))$ included in the authentication certificate. In one example, verification information may be generated based on the seeds $S_A$ and $S_B$ stored in the authentication response terminal B 200 and the hashed public key $H(PK_A)$ included in the authentication certificate, and the generated verification information may be compared with the verification information $H(S_A, S_B, H(PK_A))$ included in the authentication certificate. Thus, the verification information $H(S_A, S_B, H(PK_A))$ of the authentication certificate may be verified.

In response to authentication succeeding as the result of the verification, the authentication certificate verifying unit 214 may store the identification information and the hashed public key $H(PK_A)$ in the memory unit 240, and may transmit an authentication certificate response message including a verification result to the authentication request terminal A 100.

In response to an authentication request message, including identification information, a random number r, a public key $PK_A$, and verification information $H(H(S_B, r), H(PK_A))$, being received from the authentication request terminal A 100, the authentication unit 215 may verify the verification information $H(H(S_B, r), H(PK_A))$ included in the authentication request message. In one example, verification information may be generated based on the seed $S_B$ and a hashed public key $H(PK_A)$ stored in the memory unit 240, and based on the random number r stored in the authentication request message. The generated verification information may be compared with the verification information $H(H(S_B, r), H(PK_A))$ included in the authentication request message, which may verify the verification information $H(H(S_B, r), H(PK_A))$ of the authentication request message.

Also, the authentication unit 215 may transmit an authentication request message including a verification result to the authentication request terminal A 100.

The session key generating unit 216 may generate a random number, and may encode the generated random number, based on the public key $PK_A$ of the authentication request terminal that is a target of the secure communication, to generate a session key.

The secure communication processing unit 217 may generate a code channel message including the session key, may encode the code channel message, and may transmit the encoded code channel message to the authentication request terminal A 100. The code channel message may be encoded based on the public key $PK_A$ of the authentication request terminal A 100 that is the target of the secure communication terminal.

Also, the secure communication processing unit 217 may generate the code channel with the authentication request terminal A 100 using the session key, and may provide the secure communication via the code channel.

The controller 210 may generally control the authentication response terminal B 200, and may also control the key generating unit 211, the seed generating unit 212, the hash calculating unit 213, the authentication certificate verifying unit 214, the authentication unit 215, the session key generating unit 216, and the secure communication processing unit 217. Alternatively, the controller 210 may perform functions of the key generating unit 211, the seed generating unit 212, the hash calculating unit 213, the authentication certificate verifying unit 214, the authentication unit 215, the session key generating unit 216, and the secure communication processing unit 217. The key generating unit 211, the seed generating unit 212, the hash calculating unit 213, the authentication certificate verifying unit 214, the authentication unit 215, the session key generating unit 216, and the secure communication processing unit 217 may be separately configured and illustrated to separately describe each of the function. However, when a product is embodied, the controller 210 may be configured to perform all the described functions or may be configured to perform a part of the functions.

Although the descriptions with reference to FIGS. 1 and 2 separately describe the authentication request terminal A 100 and the authentication response terminal B 200, a single portable terminal may perform both requesting of an authentication and responding to the request for the authentication. Accordingly, the authentication request terminal A 100 and the authentication response terminal B 200 may be included in the single portable terminal.

An example of an authentication method in the portable terminal including both the authentication request terminal A 100 and the authentication response terminal B 200 is described with reference to the examples in FIGS. 3 to 5.

Figure 3:
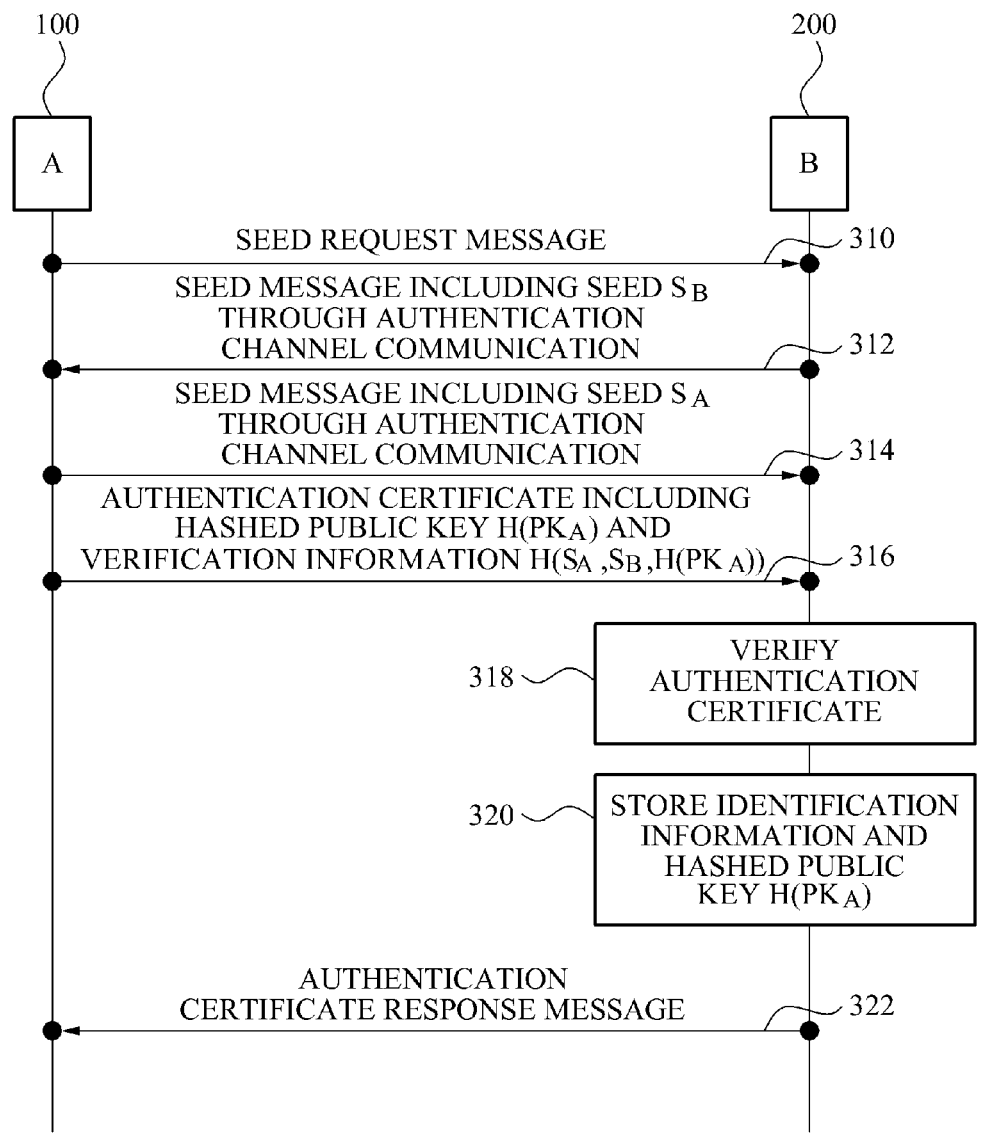
FIG. 3 is a diagram illustrating an example of a process of registering an authentication certificate between portable terminals.

FIG. 3 illustrates an example of a process of registering an authentication certificate between portable terminals. Referring to the example of FIG. 3, an authentication request terminal A 100 may generate the public key $PK_A$ and the secret key $SK_A$ of the authentication request terminal A 100. The authentication request terminal A 100 may transmit a seed request message 310 including identification information to the authentication response terminal B 200. In one example, the identification information may be a telephone number that may identify the authentication request terminal A 100 or may be identification information previously registered in the authentication response terminal B 200.

The authentication response terminal B 200 that receives the seed request message 310 may verify the identification information included in the seed request message 310 to verify the authentication request terminal A 100. As an example, when the identification information is the telephone number, the authentication response terminal B 200 may search for a phone number, e.g., the identification information, from the telephone book to determine whether to allow the secure communication.

Also, in response to the authentication request terminal A 100 being determined to be a terminal for which the secure communication is allowable, the authentication response terminal B 200 may generate a seed $S_B$, and may transmit a seed message 312 including the seed $S_B$ to the authentication request terminal A 100 via an authentication channel. In one example, the seed message 312 may be included in an SMS message or an MMS message.

The authentication request terminal A 100 that receives the seed message 312 may generate a seed $S_A$ of the authentication request terminal A 100, and may transmit the seed message 314 including the seed $S_A$ to the authentication response terminal B 200 via the authentication channel.

Subsequently, the authentication request terminal A 100 may generate an authentication certificate 316 including a hashed public key $H(PK_A)$ and verification information $H(S_A, S_B, H(PK_A))$. The authentication request terminal A 100 may transmit the generated authentication certificate 316 to the authentication response terminal B 200.

The authentication response terminal B 200 may verify the verification information $H(S_A, S_B, H(PK_A))$ included in the authentication certificate 316 in operation 318. In one example, verification information may be generated based on the seeds $S_A$ and $S_B$ included in the authentication response terminal B 200, and based on the hashed public key $H(PK_A)$ included in the authentication certificate 316. The generated verification information may be compared with the verification information $H(S_A, S_B, H(PK_A))$ included in the authentication certificate 316. Thus, the verification information $H(S_A, S_B, H(PK_A))$ of the authentication certificate may be verified.

In response to the verification information being verified, the authentication response terminal B 200 may store identification information and the hashed public key $H(PK_A)$ in operation 320. Also, the authentication response terminal B 200 may transmit an authentication certificate response message 322 including a verification result to the authentication request terminal A 100.

Figure 4:
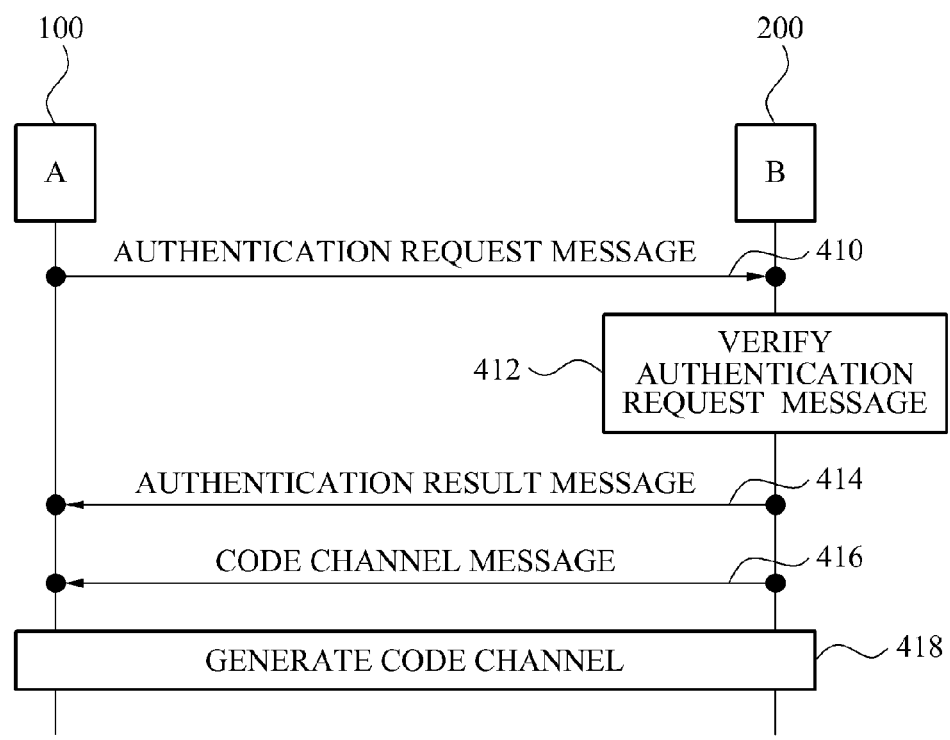
FIG. 4 is a diagram illustrating an example of a process of authenticating between portable terminals and a process of generating a code channel.

FIG. 4 illustrates examples of a process of authenticating between portable terminals and a process of generating a code channel. Referring to FIG. 4, the authentication request terminal A 100 may transmit, to an authentication response terminal B 200, an authentication request message 410 including identification information, a random number r, a public key $PK_A$, and verification information $H(H(S_B, r), H(PK_A))$.

In operation 412, in response to the authentication request message 410 being received, the authentication response terminal B 200 may verify the verification information $H(H(S_B, r), H(PK_A))$ included in the authentication request message 410. In one example, verification information may be generated based on a seed $S_B$ and a hashed public key $H(PK_A)$ stored in the authentication response terminal B 200 and the random number r included in the authentication request message 410. The generated verification information may be compared with the verification information $H(H(S_B, r), H(PK_A))$ included in the authentication request message 410. Thus, the verification information $H(H(S_B, r), H(PK_A))$ of the authentication request message 410 may be verified.

The authentication response terminal B 200 may transmit an authentication result message 414 including a verification result to the authentication request terminal A 100.

Also, the authentication response terminal B 200 may generate a session key, may encode a code channel message including the session key, and may transmit the encoded code channel message 416 to the authentication request terminal A 100. The code channel may be encoded based on the public key $PK_A$ of the authentication request terminal A 100 that is a target of the secure communication.

In operation 418, the authentication request terminal A 100 and the authentication response terminal B 200 may generate a code channel between the authentication request terminal A 100 and the authentication response terminal B 200 using the session key.

Figure 5:
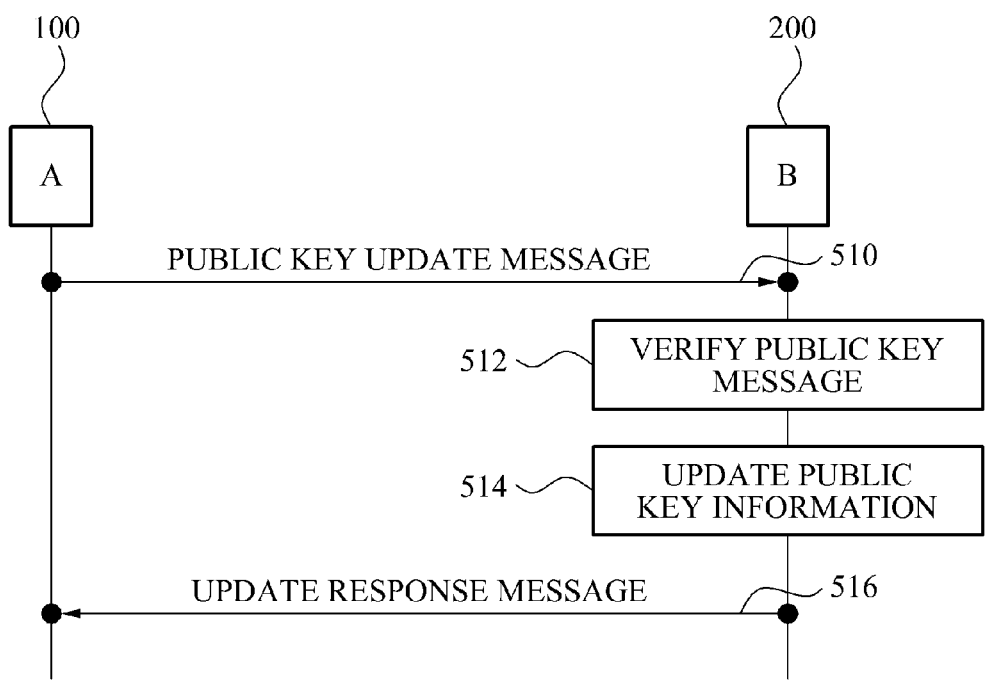
FIG. 5 is a diagram illustrating an example of a process of updating a public key.

FIG. 5 illustrates an example of a process of updating a public key. Referring to FIG. 5, the authentication request terminal A 100 may transmit, to the authentication response terminal B 200, a public key update message 510 including an update public key. The public key update message 510 may include identification information, a random number r, a public key $PK_A$, and verification information $H(S_A, S_B, r, H(PK_A))$. In one example, the public key $PK_A$ may be the update public key and a hashed public key $H(PK_A)$ may be a hash value of the update public key.

In operation 512, in response to the public key update message 510 being received, the authentication response terminal B 200 verifies verification information $H(S_A, S_B, r, H(PK_A))$ included in the public key update message 510. In one example, verification information may be generated based on seeds $S_A$ and $S_B$ stored in the authentication response terminal B 200, the random number r, and the public key $PK_A$ included in the public key update message 510. The generated verification information may be compared with the verification information $H(S_A, S_B, r, H(PK_A))$ included in the public key update message 510, to verify the verification information $H(S_A, S_B, r, H(PK_A))$ included in the public key update message 510.

In operation 514, in response to the verification information $H(S_A, S_B, r, H(PK_A))$ being verified, the authentication response terminal B 200 may update a stored public key as the update public key included in the public key update message 510.

In addition, the authentication response terminal B 200 may transmit an update response message 516 including a verification result to the authentication request terminal A 100.

Figure 6:
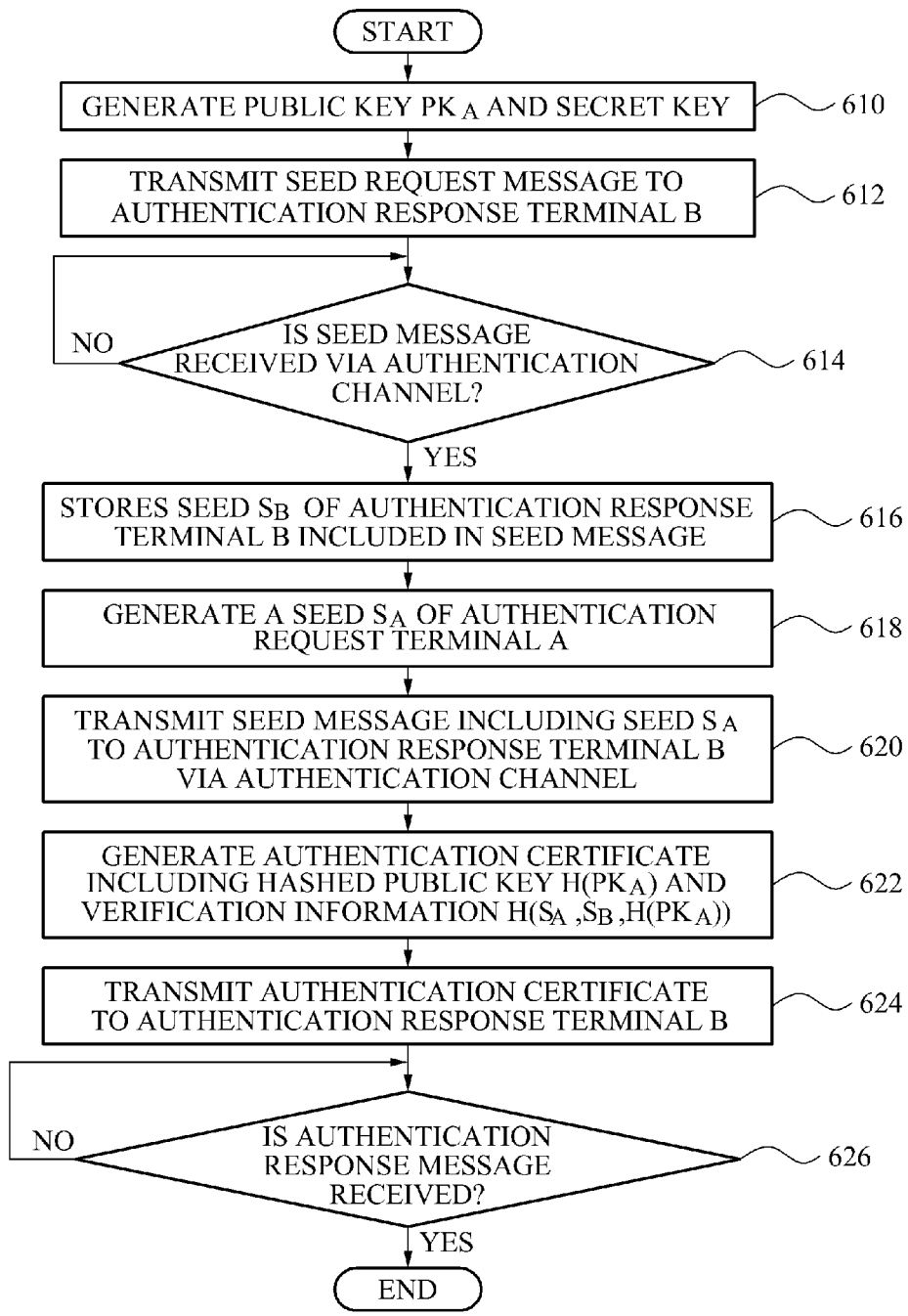
FIG. 6 is a flowchart illustrating an example of a process of issuing an authentication certificate from an authentication request terminal.

FIG. 6 illustrates an example of a process of issuing an authentication certificate from an authentication request terminal. Referring to the example in FIG. 6, in operation 612, the authentication request terminal A 100 may generate a public key $PK_A$ and a secret key $SK_A$ of the authentication request terminal A 100 in operation 610, and transmits a seed request message to the authentication response terminal B 200. In one example, the seed request message may include a telephone number or identification information that may identify the authentication request terminal A 100.

In operation 614, a determination may be made as to whether a seed message is received via an authentication channel. In operation 616, in response to a seed message to being received, the authentication request terminal A 100 may store a seed $S_B$ included in the seed message.

In operation 618, the authentication request terminal A 100 may generate a seed $S_A$ of the authentication request terminal A 100. In operation 620, the authentication request terminal A 100 may transmit a seed message including the seed $S_A$ to the authentication response terminal B 200.

In operation 622, the authentication request terminal A 100 may generate an authentication certificate including a hashed public key $H(PK_A)$ and verification information $H(S_A, S_B, H(PK_A))$. In operation 624, the authentication request terminal A 100 may transmit the generated authentication certificate to the authentication response terminal B 200. In operation 622, in response to an authentication response message being received, the authentication request terminal A 100 may determine whether the authentication certificate is successfully issued and may complete the process of issuing an authentication certificate from an authentication request terminal.

Figure 7:
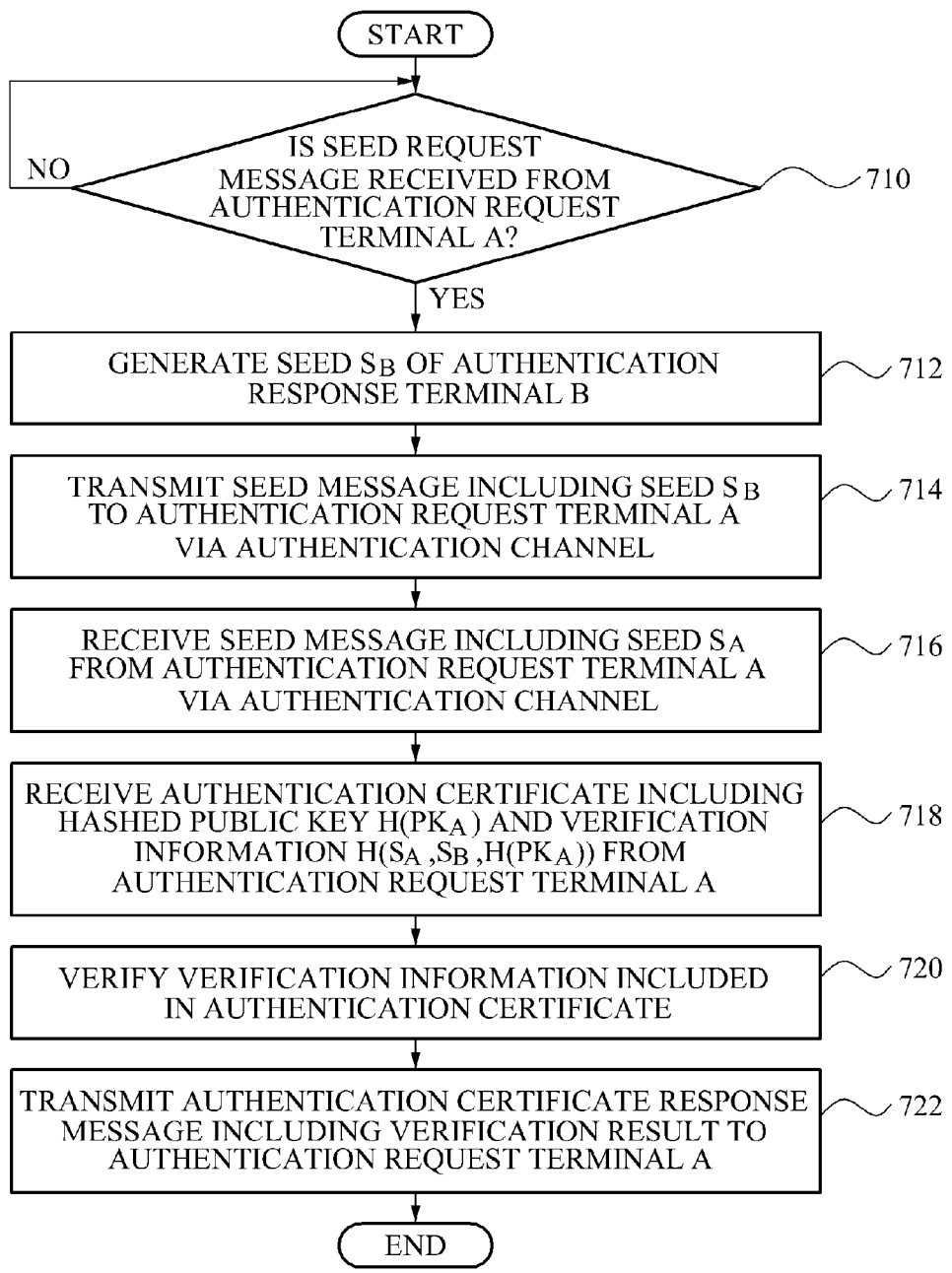
FIG. 7 is a flowchart illustrating an example of a process in which an authentication response terminal registers an authentication certificate.

FIG. 7 illustrates an example of a process in which an authentication response terminal B 200 registers an authentication certificate. Referring to the example in FIG. 7, in operation 710, a determination may be made as to whether a seed request message is received from the authentication request terminal A 100. In operation 712, in response to a seed request message being received, the authentication response terminal B 200 may generate a seed $S_B$ of the authentication response terminal B 200.

In operation 714, the authentication response terminal B 200 may transmit a seed message, including the seed $S_B$, to the authentication request terminal A 100 via an authentication channel.

In operation 716, the authentication response terminal B 200 may receive a seed message including a seed $S_A$ from the authentication request terminal A via the authentication channel.

In operation 718, the authentication response terminal B 200 may receive an authentication certificate, including a hashed public key $H(PK_A)$ and verification information $H(S_A, S_B, H(PK_A))$, from the authentication request terminal A.

In operation 720, the authentication response terminal B 200 may verify the verification information $H(S_A, S_B, H(PK_A))$ included in the authentication certificate in operation 720. In one example, verification information may be generated based on the seeds $S_A$ and $S_B$ stored in the authentication response terminal B 200, and based on a hashed public key $H(PK_A)$ included in the authentication certificate. The generated verification information may be compared with the verification information $H(S_A, S_B, H(PK_A))$ included in the authentication certificate, to verify the verification information $H(S_A, S_B, H(PK_A))$ of the authentication certificate.

In operation 722, the authentication response terminal B 200 may transmit an authentication certificate response message, including a verification result, to the authentication request terminal A 100.

Figure 8:
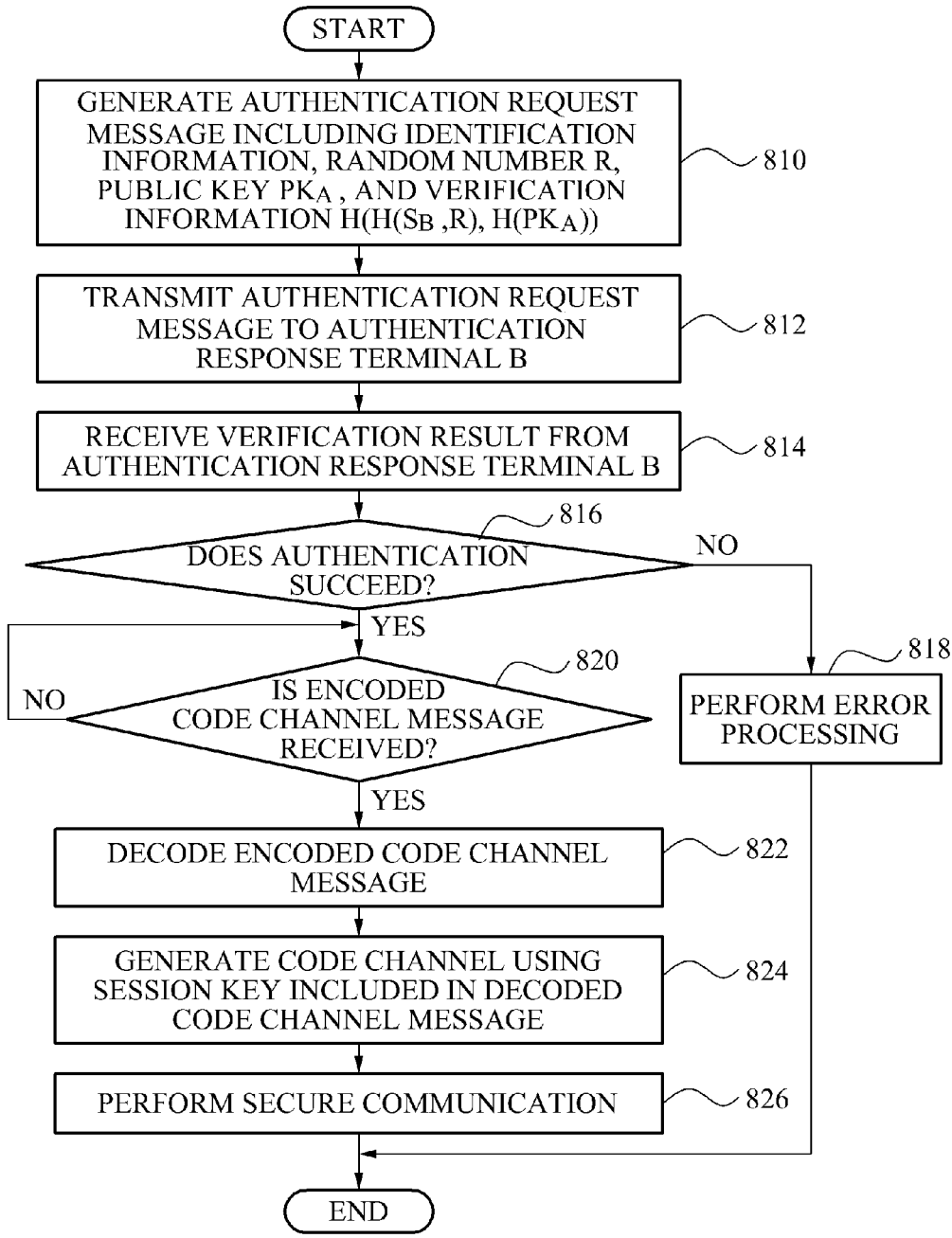
FIG. 8 is a flowchart illustrating an example of a process in which an authentication request terminal is authenticated.

FIG. 8 illustrates an example of a process in which the authentication request terminal A 100 is authenticated. Referring to the example in FIG. 8, in operation 810, the authentication request terminal A 100 may generate an authentication request message including identification information, a random number r, a public key $PK_A$, and verification information $H(H(S_B, r), H(PK_A))$.

In operation 812, the authentication request terminal A 100 may transmit the authentication request message to the authentication response terminal B 200. In response to a verification result being received from the authentication response terminal B 200 in operation 814, in operation 816, the authentication request terminal A 100 may determine, based on an authentication result included in the authentication result message, whether an authentication succeeds. In response to the determination in operation 816 determining that the authentication fails, in operation 818, the authentication request terminal A 100 may perform an error processing associated with the authentication failure.

In response to the determination in operation 816 determining that the authentication succeeds, and an encoded code channel message being received from the authentication response terminal B 200 in operation 820, in operation 822, the authentication request terminal A 100 may decode the received encoded code channel message. In one example, the encoded code channel message encoded based on a public key of the authentication request terminal A 100 may be decoded based on the public key of the authentication request terminal A 100.

In operation 824, the authentication request terminal A 100 may generate a code channel using a session key included in the decoded code channel message. In operation 826, the authentication request terminal A 100 may perform a secure communication via the code channel. In one example, data to be transmitted may be transmitted after being encoded based on a public key of an opponent, and may be received encoded data may be decoded based on a secret key of the authentication request terminal A 100 that may be a corresponding terminal, allowing secure communication to be performed.

Figure 9:
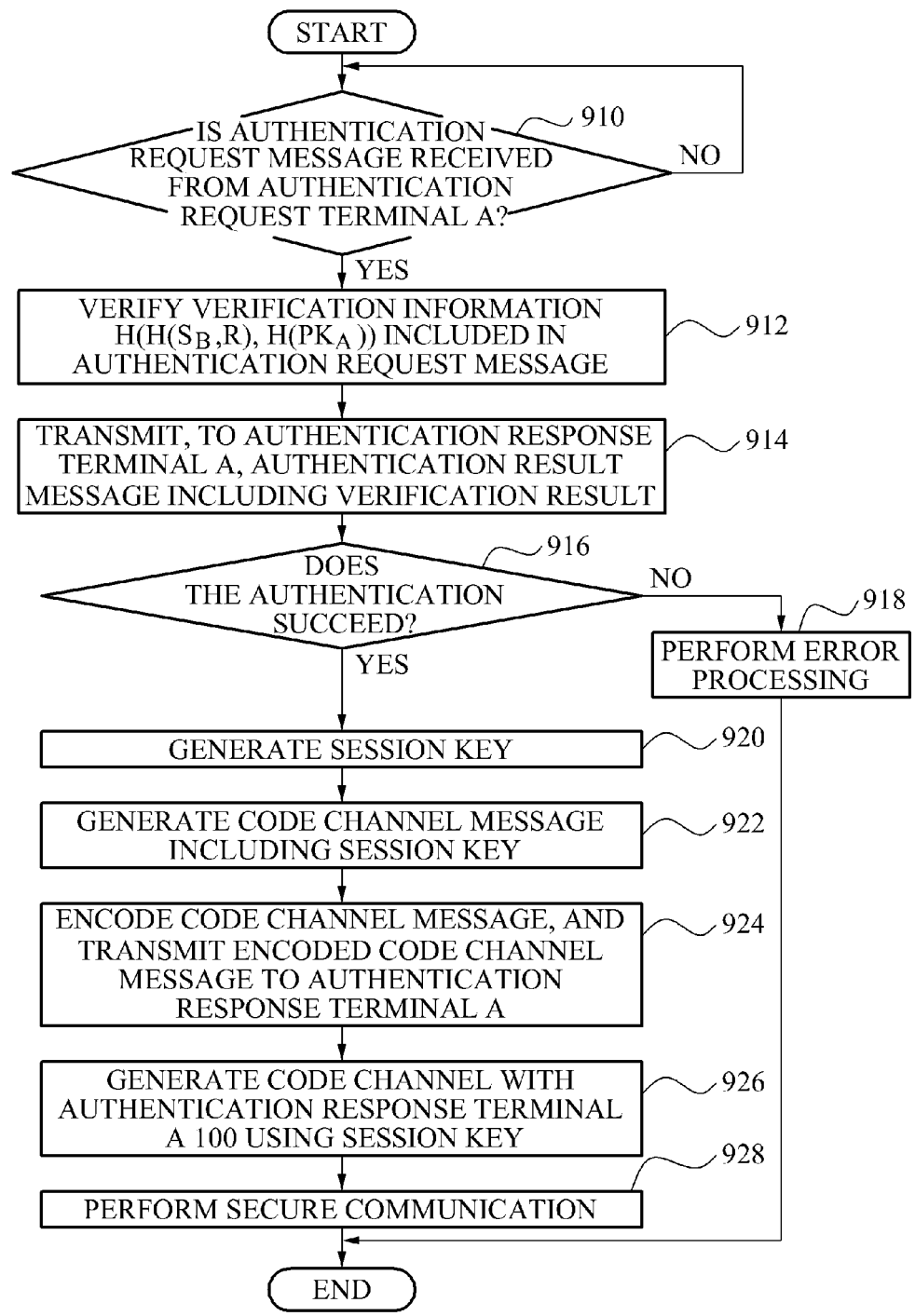
FIG. 9 is a flowchart illustrating an example of a process in which an authentication response terminal performs authentication.

FIG. 9 illustrates an example of a process in which the authentication response terminal B 200 performs authentication. Referring to the example in FIG. 9, in response to an authentication request message being received from the authentication request terminal A 100 in operation 910, the authentication response terminal B 200 may verify verification information $H(H(S_B,r), H(PK_A))$ included in the authentication request message in operation 912.

In one example, the authentication request message may include identification information, a random number r, a public key $PK_A$, and verification information $H(H(S_B,r), H(PK_A))$. In one example, verification information may be generated based on a seed $S_B$ and a hashed public key $H(PK_A)$ stored in the authentication response terminal B 200, and based on the random number r included in the authentication request message. The generated verification information may be compared with the verification information $H(H(S_B,r), H(PK_A))$ included in the authentication request message, to verify the verification information $H(H(S_B,r), H(PK_A))$.

In operation 914, the authentication response terminal B 200 may transmit, to the authentication request terminal A 100, an authentication result message including a verification result.

In operation 916, the authentication response terminal B 200 determines whether the authentication succeeds. In response to the determination in operation 916 determining that the authentication fails, the authentication response terminal B 200 may perform an error processing associated with the authentication failure in operation 918.

In response to the determination in operation 916 determining that the authentication succeeds, the authentication response terminal B 200 may generate a session key in operation 920. In one example, the authentication response terminal B 200 may generate a random number and may encode the generated random number based on a public key $PK_A$ of the authentication request terminal A 100 that may be a target of the secure communication, generating the session key.

In operation 922, the authentication response terminal B 200 may generate a code channel message including the session key. Also, in operation 924, the authentication response terminal B 200 may encode the code channel message, and may transmit the encoded code channel message to the authentication request terminal A 100. The code channel message may be encoded based on the public key $PK_A$ of the authentication request terminal A 100 that may be the target of the secure communication.

In operation 926, the authentication response terminal B 200 may generate a code channel with the authentication request terminal A 100 using the session key.

In operation 928, the authentication response terminal B 200 may perform the secure communication via the code channel. In one example, data to be transmitted may be transmitted after being encoded based on a public key of an opponent, and the received encoded data may be decoded based on a secret key of the authentication response terminal B 200 that may be a corresponding terminal, allowing the secure communication to be performed.

Figure 10:
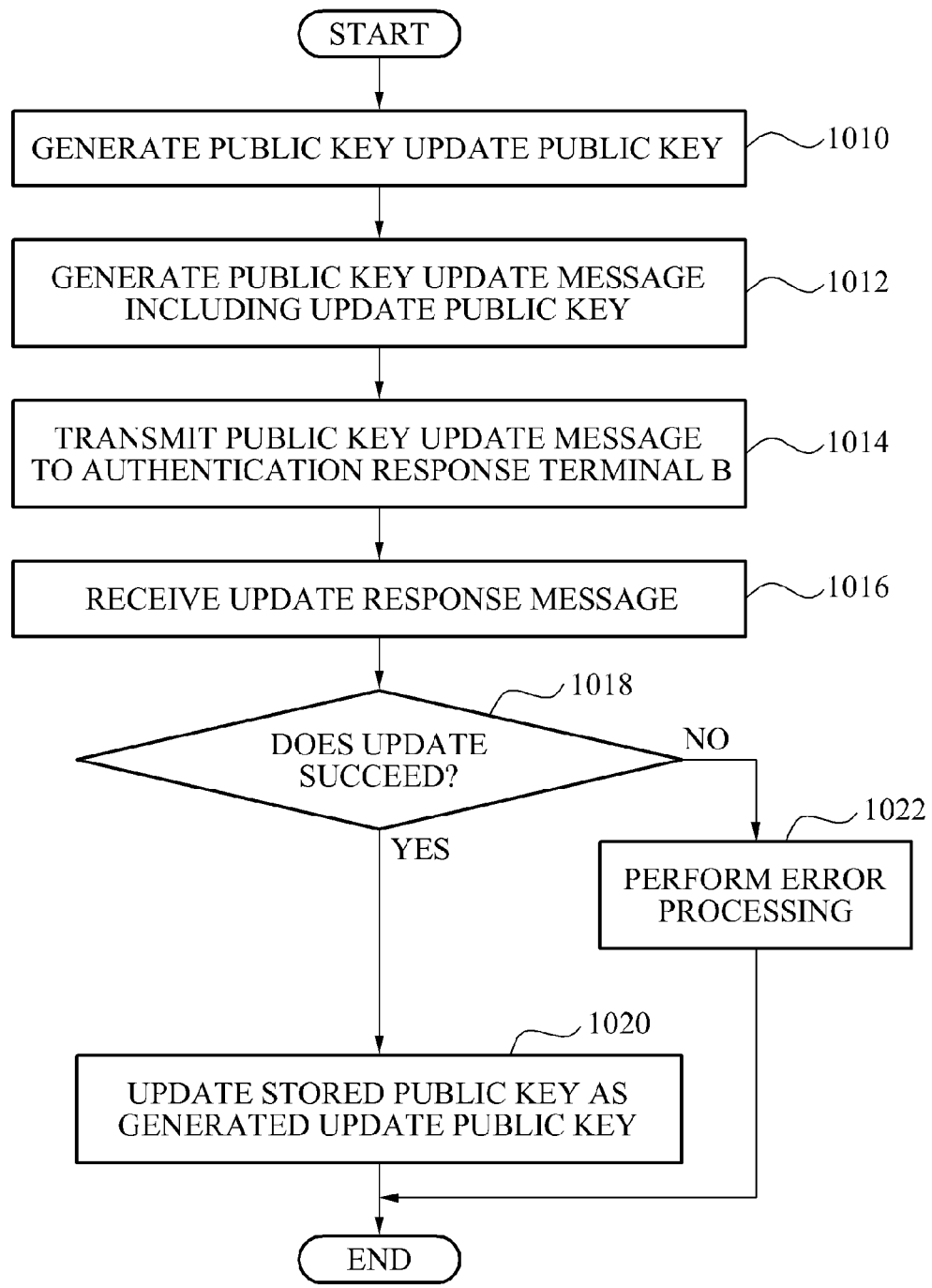
FIG. 10 is a flowchart illustrating an example of a process in which an authentication request terminal updates a public key.

FIG. 10 illustrates an example of a process in which an authentication request terminal updates a public key. Referring to the example in FIG. 10, in operation 1010, the authentication request terminal A 100 may generate an update public key.

In operation 1012, the authentication request terminal A 100 may generate a public key update message including the update public key. The public key update message may include identification information, a random number r, a public key $PK_A$, and verification information $H(S_A, S_B, r, H(PK_A))$. In one example, the public key $PK_A$ may be the update public key, and a hashed public key $H(PK_A)$ may be a hash value of the update public key.

In operation 1014, the authentication request terminal A 100 may transmit the public key update message to the authentication response terminal B 200. In response to an update response message being received from the authentication response terminal B 200 in operation 1016, the authentication request message A 100 may determine, in operation 1018, whether the updating succeeds, based on result information included in the update response message.

In response to the determination in operation 1018 determining that the update succeeds, the authentication request terminal A 100 may update a stored public key as the generated update public key in operation 1020.

In response to the determination in operation 1018 determining that the update fails, the authentication request terminal A 100 may perform an error processing associated with the update failure in operation 1022.

The terminal updating the public key of FIG. 10 may be the authentication response terminal (e.g., terminal 200) in addition to the authentication request terminal (e.g., terminal 100). That is, a single portable terminal may be used to update the public key.

Figure 11:
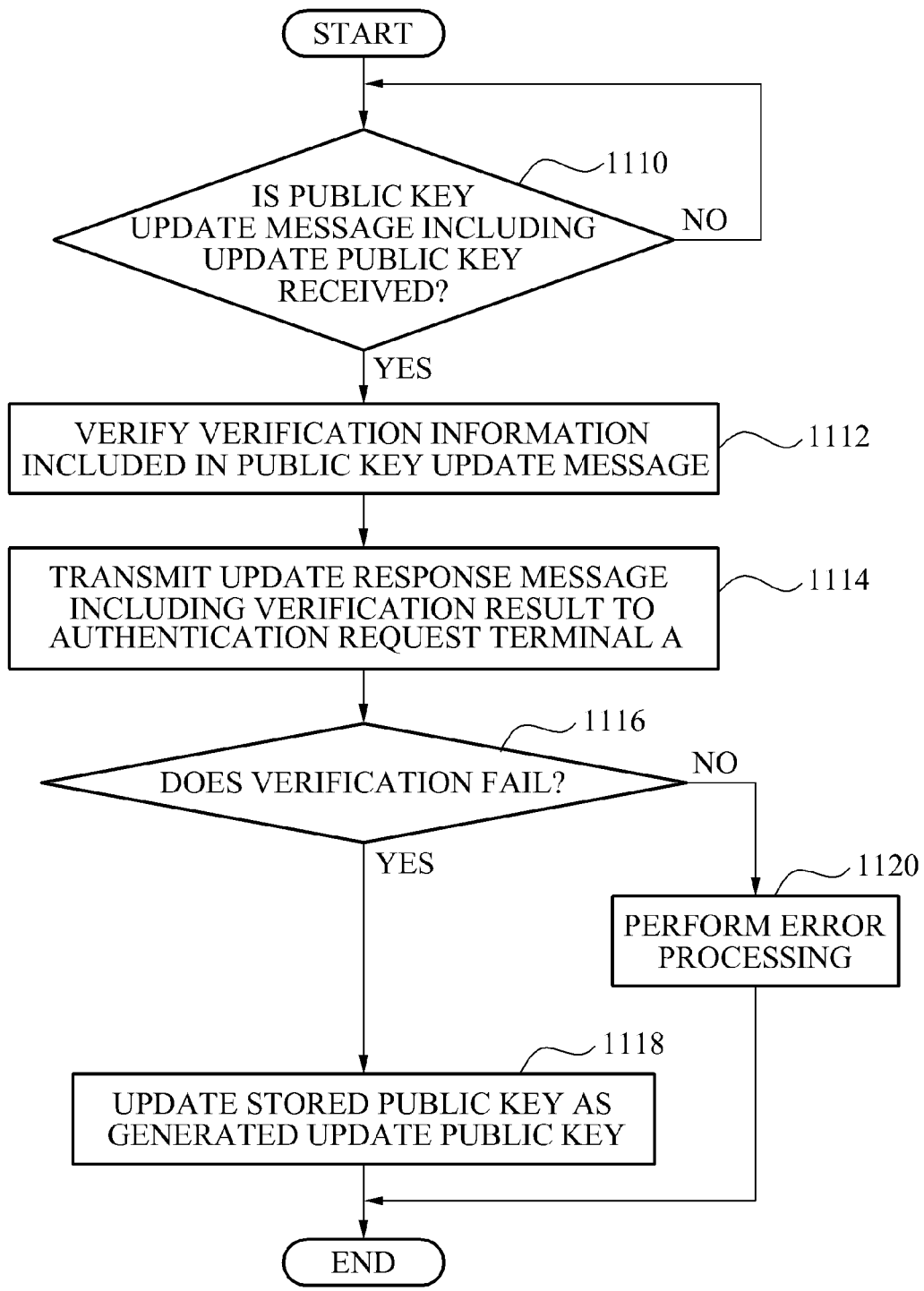
FIG. 11 is a flowchart illustrating an example of a process in which an authentication response terminal updates a public key.

FIG. 11 illustrates an example of a process in which an authentication response terminal updates a public key. Referring to the example in FIG. 11, in response to a public key update message including an update public key being received from the authentication request terminal A 100 in operation 1110, the authentication response terminal B 200 may verify verification information included in the public key update message in operation 1112. In one example, the public key update message may include identification information, a random number r, a public key $PK_A$, and verification information $H(S_A, S_B, r, H(PK_A))$. For example, the public key $PK_A$ may be the update public key, and the hashed public key $H(PK_A)$ may be a hash value of the update public key. Also, verification information may be generated based on seeds $S_A$ and $S_B$ stored in the authentication response terminal B 200 and the random number r and the public key $PK_A$ included in the public key update message. The generated verification information may be compared with the verification information $H(S_A, S_B, r, H(PK_A))$ included in the public key update message. Thus, the verification information $H(S_A, S_B, r, H(PK_A))$ included in the public key update message may be verified.

In operation 1114, the authentication response terminal B 200 may transmit an update response message including a verification result to the authentication request terminal A 100.

In operation 1116, the authentication response terminal B 200 may determine whether the verification succeeds. In response to the determination in operation 1116 determining that the verification succeeds, the authentication response terminal B 200 may update a stored public key as the generated update public key in operation 1118.

In response to the determination in operation 1116 determining that the verification fails, the authentication response terminal B 200 may perform an error processing associated with the update failure in operation 1120.

A terminal that updates the stored public key according to the public key update request of FIG. 11 may be an authentication request terminal (e.g., terminal 100) in addition to an authentication response terminal (e.g., terminal 200). That is, a single portable terminal may be used to update the public key.

As described in the examples above, there may be provided an apparatus and method whereby a portable terminal authenticates another portable terminal. One portable terminal may receive a seed generated by the other portable terminal via an authentication channel, and then may issue, to the other portable terminal, an authentication certificate that is generated based on the seed. The one portable terminal may then be authenticated by the other portable terminal using the authentication certificate, and may provide a secure communication between the two portable terminals. The one portable terminal may issue the authentication certificate using the authentication channel such as a Location-limited Channel (LLC), enabling an authentication without an authentication center or a secure sever.

The processes, functions, methods and/or software described may be recorded, stored or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media to such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, a terminal device, or portable terminal, described herein may refer to mobile devices such as a cellular phone, a personal digital assistant (PDA), a digital camera, a portable game console, and an MP3 player, a portable/personal multimedia player (PMP), a handheld e-book, a portable laptop and/or tablet PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of a portable terminal for requesting an authentication, the method comprising:
   receiving a first seed from an authentication response terminal via an authentication channel;
   transmitting a second seed to the authentication response terminal via the authentication channel;
   generating an authentication certificate comprising authentication information and verification information, the authentication information being based on a hashed public key, and the verification information being based on the first seed, the second seed, and the hashed public key; and
   requesting, by the portable terminal, the authentication of the portable terminal by transmitting the authentication certificate to the authentication response terminal.

2. The method of claim 1, wherein the authentication channel uses a location-limited channel (LLC).

3. The method of claim 1, wherein the authentication certificate comprises first verification information to verify a hashed public key and the authentication certificate, the hashed public key being generated by hashing the public key.

4. The method of claim 3, wherein the first verification information is generated by hashing the first seed, the second seed, and the hashed public key.

5. The method of claim 1, further comprising:
   generating an authentication request message;
   transmitting the authentication request message to the authentication response terminal in response to the authentication certificate being registered in the authentication response terminal; and
   setting a code channel in response to the authentication succeeding.

6. The method of claim 5, wherein the authentication request message comprises identification information, a random number, the public key, and second verification information.

7. The method of claim 6, wherein:
   the second verification information is generated by hashing a first hash value and a hashed public key; and
   the first hash value is generated by hashing the first seed and random number.

8. The method of claim 6, wherein the setting of the code channel further comprises:
   receiving a code channel message that is encoded by the public key;

decoding the received encoded code channel message to verify a session key included in the decoded code channel message; and setting the code channel using the session key.

9. A method of authenticating in a portable terminal responding to an authentication request, the method comprising:

transmitting a first seed to an authentication request terminal via an authentication channel;

receiving a second seed from the authentication request terminal via the authentication channel, in response to a request for a seed being received from the authentication request terminal; and verifying an authentication certificate in response to the authentication certificate being received from the authentication request terminal, the authentication certificate comprising authentication information and verification information, the authentication information being based on a hashed public key, and the verification information being based on the first seed, the second seed, and the hashed public key.

10. The method of claim 9, wherein the authentication channel uses a location-limited channel (LLC).

11. The method of claim 9, wherein the authentication certificate comprises first verification information verifying a hashed public key and the authentication certificate, the hashed public key being generated by hashing the public key.

12. The method of claim 11, wherein the first verification information is generated by hashing the first seed, the second seed, and the hashed public key.

13. The method of claim 9, wherein the verifying of the authentication certificate comprises:

generating first verification information; and comparing the generated first verification information with first verification information included in the authentication certificate to determine that the authentication certificate is authenticated in response to the generated first verification information being identical to the first verification information included in the authentication certificate.

14. The method of claim 13, wherein the verifying of the authentication certificate comprises:

generating second verification information; and comparing the generated second verification information with second verification information included in the authentication request message to determine that the authentication certificate is authenticated in response to the generated second verification information being identical to the second verification information included in the authentication request message.

15. The method of claim 9, further comprising:

verifying an authentication request message in response to the authentication request message being received from the authentication request terminal; and setting a code channel in response to the authentication request message being verified.

16. The method of claim 15, wherein the authentication request message comprises identification information, a random number, a public key of the authentication request terminal, and second verification information.

17. The method of claim 16, wherein:

the second verification information is generated by hashing a first hash value and the hashed public key; and the first hash value is generated by hashing the first seed and the random number.

18. The method of claim 15, wherein the setting of the code channel further comprises:

generating a session key;

generating a code channel message including the session key;

encoding the code channel message to generate the encoded code channel message;

transmitting the encoded code channel message to the authentication request terminal; and setting the code channel using a session key.

19. A portable terminal for requesting an authentication, the portable terminal comprising:

a seed generating unit configured to generate a second seed; and an authentication transmitting unit configured to:

receive a first seed from an authentication response terminal via an authentication channel;

transmit the second seed to the authentication response terminal;

generate an authentication certificate comprising authentication information and verification information, the authentication information being based on a hashed public key, and the verification information being based on the first seed, the second seed, and the hashed public key; and request the authentication of the portable terminal by transmitting the authentication certificate to the authentication response terminal.

20. The portable terminal of claim 19, further comprising:

an authentication requesting unit configured to generate an authentication request message; and transmit, to the authentication response terminal, the generated authentication request message for the authentication, in response to the authentication certificate being registered in the authentication response terminal; and a secure communication processing unit configured to set a code channel in response to the portable terminal being authenticated.

21. A portable terminal responding to an authentication request, the portable terminal comprising:

a seed generating unit configured to generate a first seed; and an authentication certificate verifying unit configured to:

transmit, to an authentication request terminal, the first seed via an authentication channel in response to a request for a seed being received from the authentication request terminal;

receive a second seed from the authentication request terminal; and verify an authentication certificate to register the verified authentication certificate in response to the authentication certificate being received from the authentication request terminal, the authentication certificate comprising authentication information and verification information, the authentication information being based on a hashed public key, and the verification information being based on the first seed, the second seed, and the hashed public key.

22. The portable terminal of claim 21, wherein the authentication verifying unit is further configured to:

generate first verification information; and compare the generated first verification information with first verification information included in the authentication certificate to determine that the authentication certificate is authenticated in response to the generated first verification information being identical to the first verification information included in the authentication certificate.

23. The portable terminal of claim 21, further comprising:
an authentication unit configured to verify an authentication request message in response to the authentication request message being received from the authentication request terminal; and
a secure communication processing unit configured to set a code channel in response to the authentication request message being authenticated.

24. The portable terminal of claim 23, wherein the authentication unit is further configured to:
generate second verification information; and
compare the generated second verification information with second verification information included in the authentication request message to determine that the authentication request message is authenticated in response to the generated second verification information being identical to the second verification information included in the authentication request message.

25. A method of authenticating between an authentication request terminal and authentication response terminal, the method comprising:
transmitting a seed request message from the authentication request terminal to the authentication response terminal;
receiving, at the authentication response terminal, the seed request message;
verifying that the authentication request terminal is a terminal for which secure communication is allowed;
in response to it being determined that the authentication request terminal is a terminal for which secure communication is allowed, transmitting a seed message, comprising a seed, to the authentication request terminal;
generating, by the authentication request terminal, a second seed;
transmitting the second seed to the authentication response terminal;
generating, by the authentication request terminal, an authentication certificate;
transmitting the authentication certificate to the authentication response terminal;
verifying, by the authentication response terminal, the authentication certificate;
storing the authentication certificate; and
transmitting, by the authentication response terminal, an authentication certificate response message comprising a verification result to register the authentication certificate.

26. The method of claim 25, further comprising:
generating, by the authentication request terminal, an authentication request message;
transmitting the authentication request message to the authentication response terminal in response to the authentication certificate being registered in the authentication response terminal; and
setting a code channel in response to the authentication succeeding.

* * * * *